US008774264B2

(12) United States Patent
Nakajima (10) Patent No.: US 8,774,264 B2
(45) Date of Patent: Jul. 8, 2014

(54) IMAGE INSERTION DEVICE FOR COMPRESSED VIDEO DATA (75) Inventor: Yasuyuki Nakajima, Saitama (JP)

(73) Assignee: KDDI Corporation, Tokyo (JP)

( * ) Notice: Subject to any disclaimer, the term of this patent is extended or adjusted under 35 U.S.C. 154(b) by 983 days.

(21) Appl. No.: 10/805,328

(22) Filed: Mar. 22, 2004

(65) Prior Publication Data
US 2004/0190611 A1 Sep. 30, 2004

(30) Foreign Application Priority Data

Mar. 28, 2003 (JP) .................................. 2003-91243

(51) Int. Cl.
H04N 7/12 (2006.01)

(52) U.S. Cl.
USPC .......................................................... 375/240

(58) Field of Classification Search
USPC .............................. 375/240; 348/699; 382/253
See application file for complete search history.

(56) References Cited

U.S. PATENT DOCUMENTS

| 5,317,397 | A  | * | 5/1994 | Odaka et al. | ............. | 375/240.15 |
| 5,805,228 | A  | * | 9/1998 | Proctor et al. | ........... | 375/240.22 |
| 6,226,041 | B1 | * | 5/2001 | Florencio et al. | ............. | 348/473 |
| 6,373,530 | B1 | * | 4/2002 | Birks et al. | ..................... | 348/584 |
| 6,621,866 | B1 | * | 9/2003 | Florencio et al. | ........ | 375/240.25 |
| 6,650,706 | B2 | * | 11/2003 | Le Maguet | ............... | 375/240.12 |
| 6,750,919 | B1 | * | 6/2004 | Rosser | ........................... | 348/584 |
| 6,895,048 | B2 | * | 5/2005 | Boice et al. | .............. | 375/240.02 |

FOREIGN PATENT DOCUMENTS

| JP | 2000-244929 A | | 9/2000 |
| JP | 2001-268572 | | 9/2001 |
| WO | WO 0133861 A1 | * | 5/2001 |
| WO | 01/52547 A1 | | 7/2001 |

OTHER PUBLICATIONS

Office Action of Japan Patent Office dated Apr. 11, 2007 issued in corresponding Japanese Patent Application No. 2003-091243.

* cited by examiner

Primary Examiner — Anner Holder
(74) Attorney, Agent, or Firm — Westerman, Hattori, Daniels & Adrian, LLP (57) ABSTRACT Input MPEG compressed data is input into a partial decoder and a logo insertion controller. A block DCT coefficients (a) output from the partial decoder is divided into a logo insertion region (c) and a non-logo insertion region (d) in a logo insertion region separator. Logo data (e) supplied from a logo information supply section is combined into the logo insertion region (c) with an arbitrary mixing ratio in a logo information insert section. In a logo region partial re-encoder, intra-frame coding of an image insertion region is executed when a starting frame for inserting an image is an intra-coded frame or a predictive coded frame, and, when the starting frame is a bidirectionally predictive-coded frame, inter-frame coding of the image insertion region is executed, and intra encoding of the image insertion region is executed in a frame to which the starting frame for inserting the image can refer.

18 Claims, 7 Drawing Sheets

IMAGE INSERTION DEVICE FOR COMPRESSED VIDEO DATA

BACKGROUND OF THE INVENTION

1. Field of the Invention

The present invention relates to an image insertion device for compressed video data, by which a logo image is inserted into video data with a high speed and high efficiency.

2. Description of the Related Art

Figure 11:
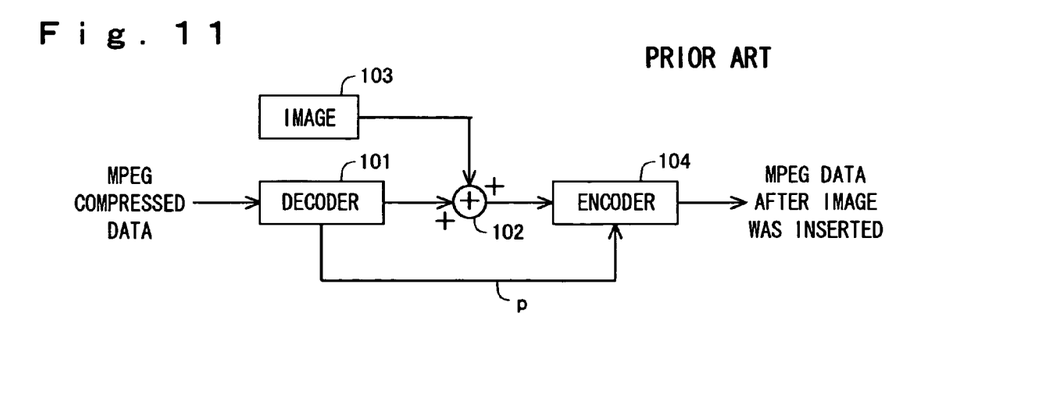
FIG. 11 is a block diagram showing a configuration according to one example of a previous device.

As a previous method for inserting an image into compressed video data, there is, for example, an image insertion method at a base band, as shown in FIG. 11. Hereinafter, operations in the previous method will be explained. In the first place, a decoder 101 decodes all data in one frame of MPEG compressed data as an input signal. Then, an image 103 to be inserted is inserted into the decoded image in a combiner 102 to be recompressed in an encoder 104. In this case, coding information (p) of input data which has been decoded in the decoder 101, for example, information such as moving information MV and encoding type is sent to the encoder 104 and is used for encoding. MPEG data after the image was inserted is output from the encoder 104.

Though an image 103 such as an logo image can be inserted into the input video without almost causing image degradation according to the previous method, there has been a very large problem that an entire amount of processing is large and the processing cost is large even if the coding information (p) on input video is used, because encoding is executed again in the encoder 104.

As another previous method for inserting an image, a method by which a logo image is inserted on the compressed data has been disclosed, for example, in the Japanese Patent Application Publication No. 2001-268572. The method comprises: a step for receiving encoded bit-stream; a step for partially decoding the bit stream; a step for inserting a visual element into the bit stream which has been partially decoded; a step for recoding the bit stream into which the visual element has been inserted; and a step for outputting the recoded bit-stream.

Since the encoded bit-stream is partially decoded according to the method, the entire amount of processing can be reduced.

However, when a logo insertion frame is started from a bidirectionally predictive-coded frame (B frame) in the previous method by which the logo image is inserted on the compressed data, there is a possibility that an encoding efficiency is reduced, because both of the logo region and the non-logo region of the starting prediction frame are recoded according to an inter-frame prediction method to cause inter-frame encoding of the logo region with a low inter-frame encoding efficiency. Here, the reason why the inter-frame encoding efficiency of the starting frame is low is that the inter-frame correlation of the logo region is very weak because there is no logo in frames before the starting frame.

Moreover, since encoding is executed without depending on the mixing ratio between the logo image and the original one, there is a possibility that the encoding efficiency for the logo image with a high mixing ratio (for example, when a deep logo image is combined) is reduced when encoding according to the inter-frame prediction is used in a similar manner to that of the original video.

Here, when an intra-coded frame, instead of the bidirectionally predictive-coded frame (B frame) of the starting frame, is used in order to solve the above-described problem, there has been a problem that image degradation is caused since intra encoding which requires a large amount of bits is used, in spite of a state in which a distributed amount of bits for the bidirectionally predictive-coded frame is small, therefore the amount of bits required for intra encoding becomes insufficient.

SUMMARY OF THE INVENTION

The object of the present invention is to provide an image insertion device for compressed video data, by which an image, for example, a logo image is inserted into video data with a high speed and high efficiency. Another object is to provide an image insertion device for compressed video data, by which recoding can be executed without causing image degradation even when logo insertion is required to be started from a bidirectionally predictive-coded frame.

In order to accomplish the object, a feature of the invention resides in that an image insertion device for compressed video data, comprises a partial decoder for partially decoding of compressed video data which has been input, an image insertion unit for inserting an image into a part of video data which has been partially decoded with the partially decoder, an partial re-encoder for partially recompressing according to an image insertion region into which the image has been inserted with the image insertion unit, and a bit-amount control unit for controlling the bit amount of recompressed data with the partial re-encoder to a target bit amount.

According to the feature, an image, for example, a logo image can be inserted into a part of an original video with a high speed and a high efficiency.

Another feature of the invention resides on that when the encoding mode of the whole of the starting frame for inserting the image is a bidirectionally predictive-coded frame, inter-frame coding of the image insertion region is executed, and intra-frame coding of the image insertion region is executed in case of a frame to which the starting frame for inserting the image can refer.

According to the feature, a part into which an image is inserted can be recompressed without causing an insufficient amount of bits and image degradation, and with a high speed and a high efficiency, even if the encoding mode of the whole starting frame for inserting an image is a bidirectional prediction encoded frame.

Another feature of the invention resides in that quantization in the partial re-encoder is executed by partially decoding a transform coefficient, after inter-frame coding in a partial manner, for motion compensation prediction, and by using the transform coefficient which has been transformed and quantized after the motion compensation prediction.

According to the feature, a strain of a pictures in an image insertion region is extremely reduced.

DETAILED DESCRIPTION OF THE PREFERRED EMBODIMENT

Figure 1:
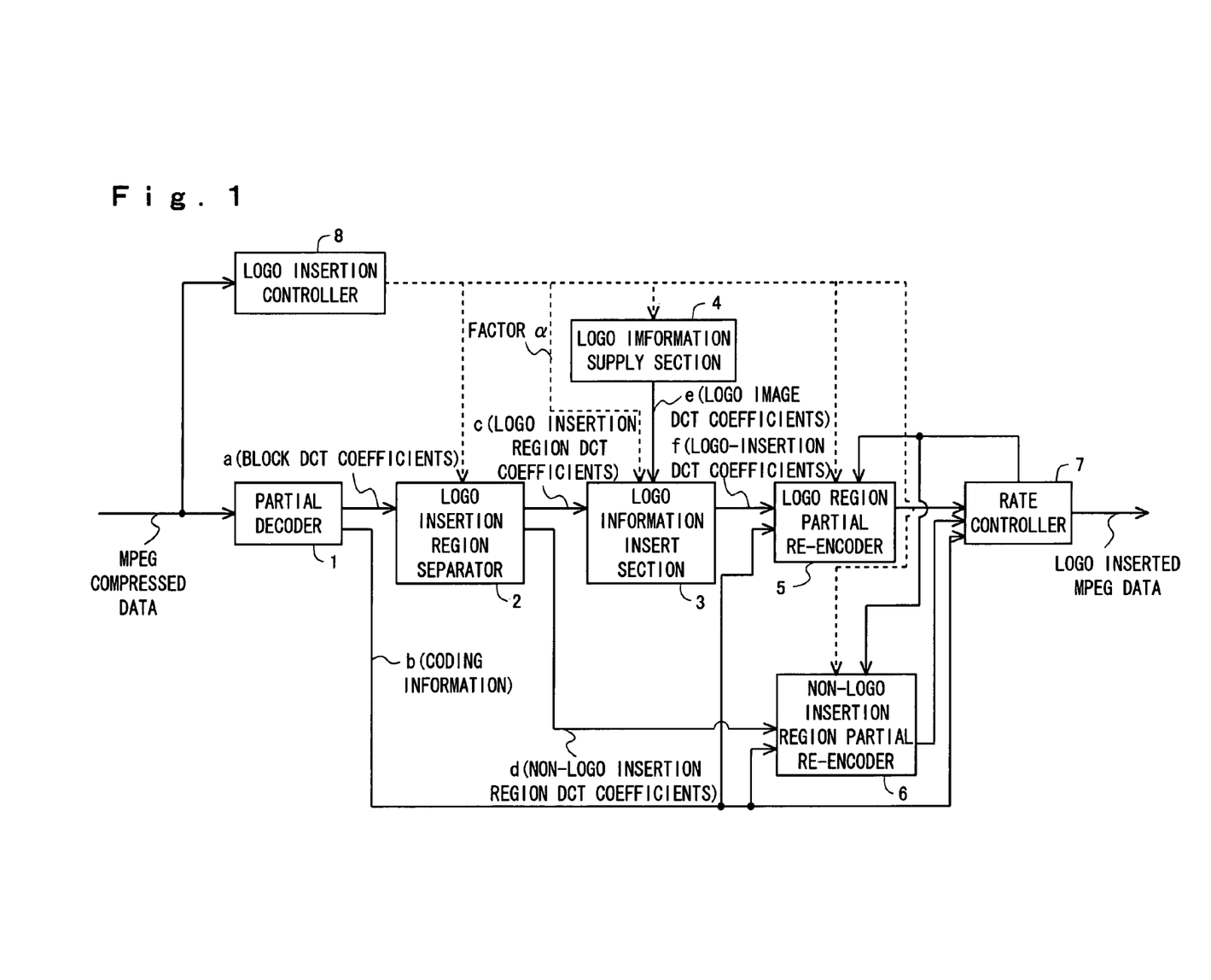
FIG. 1 is a block diagram showing a schematic view of a configuration according to one embodiment of the present invention.

Hereinafter, the present invention will be explained in detail, referring to drawings. FIG. 1 is a block diagram showing a schematic view of a whole configuration of one embodiment according to the present invention.

Figure 2:
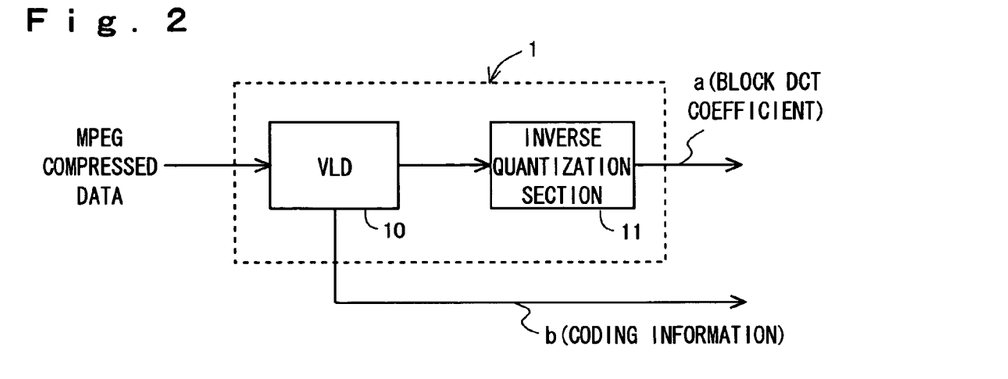
FIG. 2 is a block diagram showing one concrete example of a partial decoder in FIG. 1.

MPEG compressed data as an input data is input to a partial decoder 1 and a logo insertion controller 8. As shown in FIG. 2, the partial decoder 1 comprises, for example, a variable-length decoder (VLD) 10 and an inverse quantization section 11, and outputs a block DCT coefficients (a). At the same time, coding information (b) such as a motion vector MV, an encoding type, and a quantization parameter (QP) is separately output.

On the other hand, the logo insertion controller 8 controls a logo insertion region separator 2, a logo information insert section 3, a logo information supply section 4, a logo region partial re-encoder 5, and a non-logo region partial re-encoder 6, which will be described later. Here, details of control operations in the logo region partial re-encoder 5 and the non-logo region partial re-encoder 6 will be described later, referring to FIG. 5. A rate controller 7 executes rate control according to the complexity of a picture, therefore the bit amount of partially recompressed data in the logo region partial re-encoder 5 and the non-logo region partial re-encoder 6 is controlled to a target bit amount.

In the rate controller 7, the rate control can be executed according to the complexity of a picture, but, instead of calculating the complexity such as a deviation in the picture, quantization information obtained from the partial decoder 1 can be used as complexity information. For example, a judgment that a higher quantization step means the higher complexity of the picture can be used in the rate control.

Then, the block DCT coefficients (a) output from the partial decoder 1 is divided into a logo insertion region DCT coefficients (c) and a non-logo insertion region DCT coefficients (d) in the logo insertion region separator 2. The logo insertion region DCT coefficients (c) is sent to the logo information insert section 3, and the non-logo insertion region DCT coefficients (d) is sent to the non-logo region partial re-encoder 6.

Figure 3:
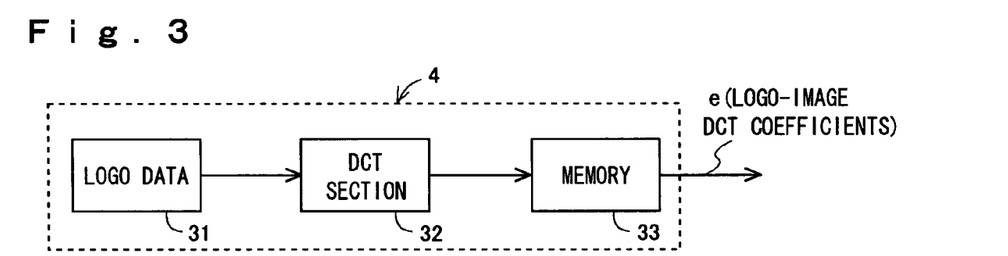
FIG. 3 is a block diagram showing one concrete example of a logo information supply section in FIG. 1.

Logo information to be inserted is supplied from the logo information supply section 4. As shown in FIG. 3, the logo information supply section 4 comprises, for example, a DCT section 32 for DCT transforming of logo data 31 and a memory 33 for storing a DCT coefficients of the logo after the DCT transforming. Accordingly, a logo-image DCT coefficients (e) is output from the memory 33 according to an instruction from the logo insertion controller 8.

Figure 4:
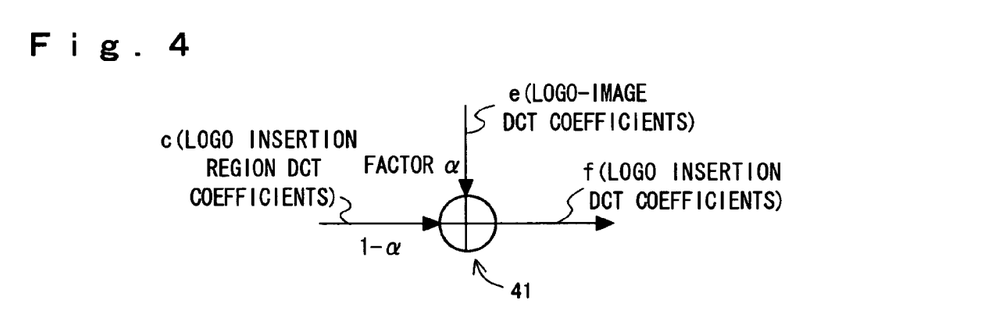
FIG. 4 is a block diagram showing one concrete example of a logo information insert section in FIG. 1.

As shown in FIG. 4, the logo information insert section 3 shown in FIG. 1 comprises, for example, a combining section 41, which combines the logo insertion region DCT coefficients (c) and the logo-image DCT coefficients (d) for output of a logo insertion DCT coefficients (f). At this time, the mixing is executed, considering a transparency factor (or, a mixing ratio) α (0≤α≤1), which is instructed from the logo insertion controller 8.

In this case, the following logo insertion DCT coefficients LI(u, v) is obtained, assuming that a logo insertion region DCT coefficients is LA(u, v) and a logo-image DCT coefficients is LG(u, v);

$$LI(u,v)=\alpha \times LG(u,v)+(1-a)\times LA(u,v)$$

For example, transparency factor α is assumed to be 1 when the logo insertion region of an original video is replaced by the deepness with a logo image DCT coefficients (e) of 100%. transparency factor α is assumed to be 0.5 when replaced by the half deepness. The logo information insert section 3 outputs the logo insertion DCT coefficients (f). Here, the DCT coefficients combined in the combining section 41 may be only for its direct component, or only for its direct component plus the low frequency component.

Then, the logo insertion DCT coefficients (f) and the coding information (b) are input to the logo region partial re-encoder 5 in which the logo insertion region is encoded by control from the logo insertion controller 8. On the other hand, the non-logo insertion region DCT coefficients (d) and the coding information (b) are input to the non-logo region partial re-encoder 6 in which the non-logo region and the non-logo insertion frame are encoded.

Hereinafter, the control operations in the logo insertion controller 8 for the logo region partial re-encoder 5 and the non-logo region partial re-encoder 6 will be explained, referring to a flow diagram in FIG. 5.

At a step S1, it is judged whether the MPEG compressed data which has been input is a logo insertion frame or not, and the processing proceeds to a step S2 when the judgment is YES. At the step S2, it is judged whether the frame is a logo insertion region or not. When the judgment is YES, the processing proceeds to a step S3, but the processing proceeds to a step 12 when the judgment either at the step S1 or S2 is NO. At the step S12, requantization is executed as will be described in FIG. 10.

At the step S3, it is judged whether the logo insertion frame is a starting frame for inserting the logo image or not. When the judgment is YES, the processing proceeds to a step S4 at which it is judged whether the starting frame is an I or P picture. When the judgment is YES, the processing proceeds to a step S5 at which an instruction for intra-frame coding the logo insertion region is output. On the other hand, when the judgment is NO, that is, when the frame is a B picture, the processing proceeds to a step S6 at which an instruction for intra-frame coding a logo insertion region of the subsequent reference frame is output. At a step S7, an instruction for inter-frame coding the logo insertion region of the current frame is output, using the subsequent reference frame.

When the judgment at the step S3 is NO, that is, when the logo insertion frame is not the starting frame for logo insertion, the processing proceeds to a step S8 at which it is judged whether the transparency factor α is larger than a predetermined threshold Th or not. When the judgment is YES, that is, when the weight of the logo image is larger the threshold, the processing proceeds to a step S9 at which the motion vector MV is set as 0, and an instruction for inter-frame coding the logo insertion region is output. The reason is that the larger weight of the logo image can be considered to be the small or zero motion because a logo image is generally a static image with no motion.

On the other hand, when the judgment at the step S8 is NO, it can be considered that the motion of the image in the logo insertion region is large because the ratio of the original video to be combined is large. Accordingly, at a step S10, interframe coding of the logo insertion region will be executed, reusing the motion vector MV of the input MPEG data, that is, the motion vector MV in the coding information (b). Thereby, the processing amount can be reduced, and it is possible to realize the high-speed processing. After completion of encoding at the steps S5, S7, S9, and S10, the processing proceeds to a step S11 at which the requantization is executed as will be described in FIG. 7 or FIG. 8.

Figure 6A:
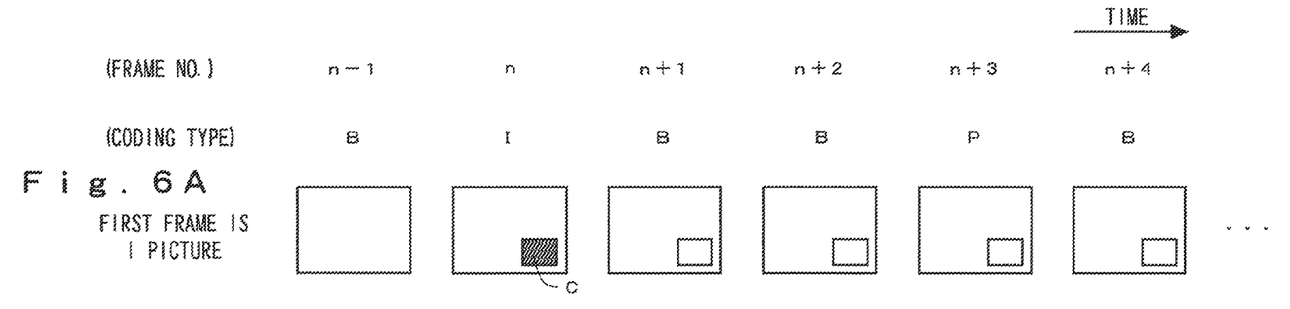
FIG. 6 is an exemplary view of processing at steps S4 through S7 in FIG. 5.
Figure 6B:
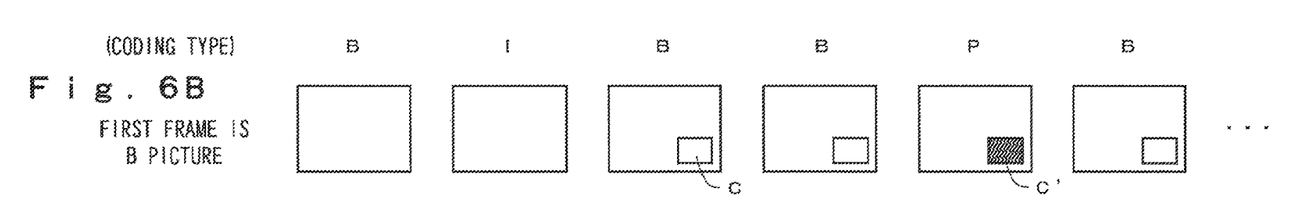
Figure 6C:
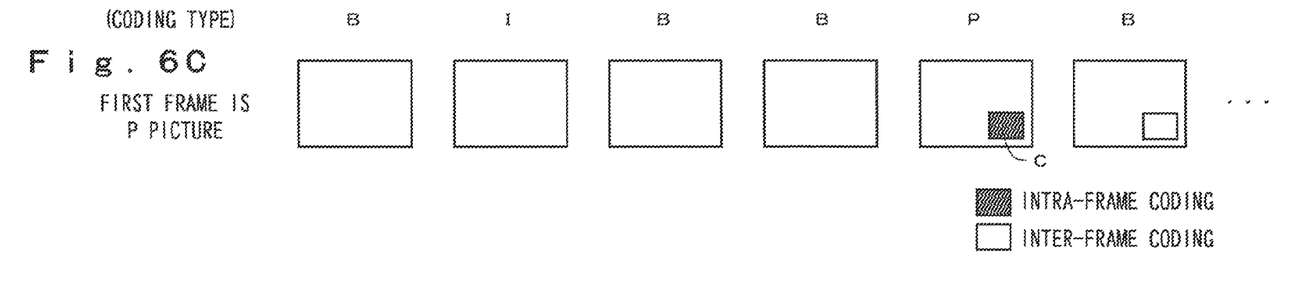

FIG. 6 shows operations at the steps S4 through S7. As shown in FIGS. 6A and 6C, intra-frame coding is executed for the logo insertion region (c) of a first frame when the first frame for logo insertion, that is, a starting frame for logo insertion is an I or P picture. On the other hand, when the first frame is a B picture as shown in FIG. 6B, intra-frame coding is first executed for the logo insertion region (c') of a P picture of the subsequent reference frame, and then inter-frame coding is executed for the logo insertion region (c) for a B picture of the first frame, using the encoded data of the logo insertion region (c') of the P picture.

Figure 7:
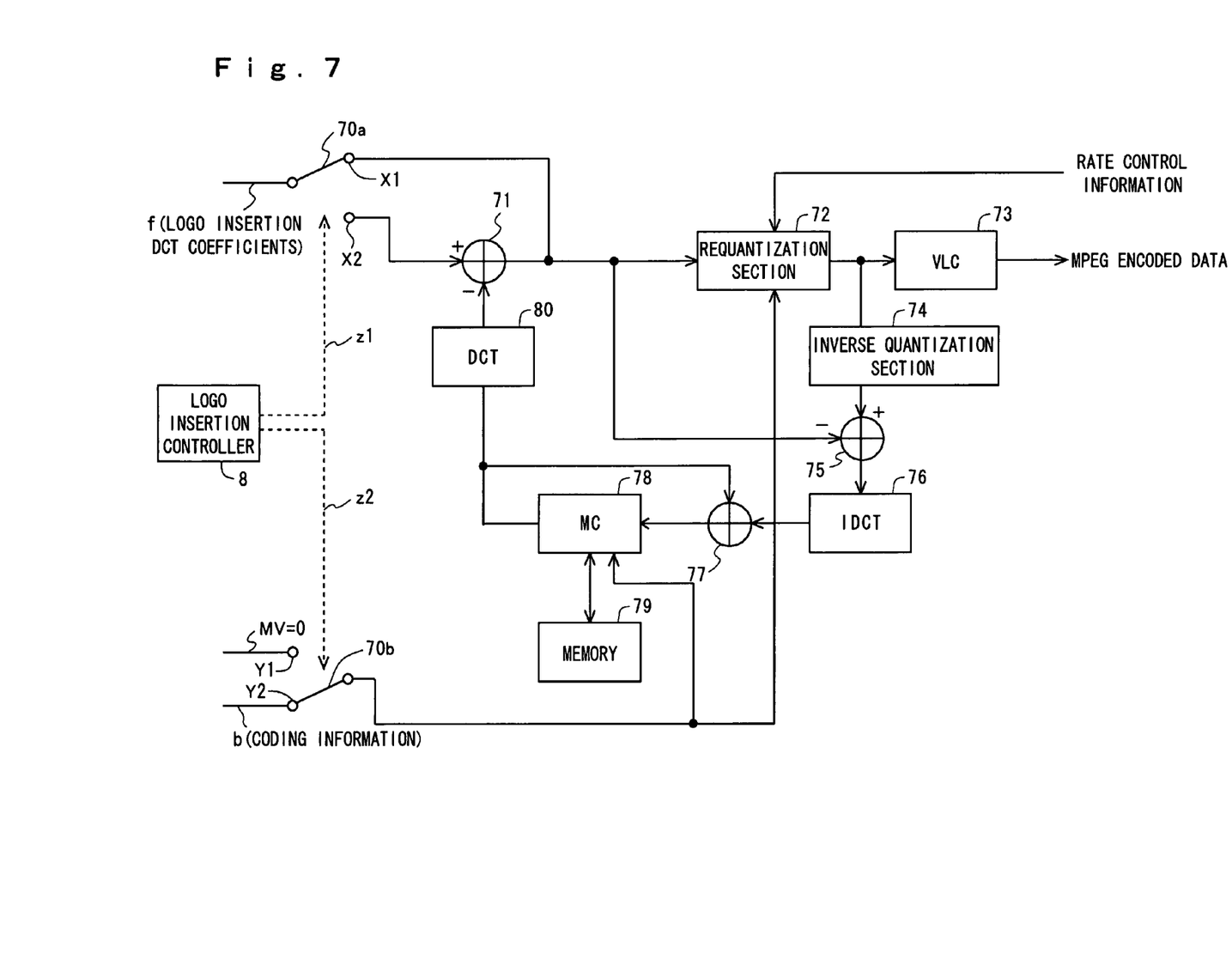
FIG. 7 is a block diagram showing one concrete example of a logo region partial re-encoder in FIG. 1.

FIG. 7 is a functional block diagram showing one example of the logo region partial re-encoder 5. Switching sections 70a, 70b are controlled by control information from the logo insertion controller 8. That is, when the control information (z1) is for intra-frame coding, the switching section 70a selects a terminal (X1), while when the information is for inter-frame coding, a terminal (X2) is selected. On the other hand, when control information (z2) is in the case of MV=0 as shown at step S9 in FIG. 5, the switching section 70b selects a terminal (Y1), while when the MV of the input MPEG data is reused as shown at step S10, a terminal (Y2) is selected.

In the case of intra-frame coding, by the above operations, the logo insertion DCT coefficients (f) is requantized in a requantization section 72, encoded in a variable-length coding section 73, and then output as MPEG encoded data.

On the other hand, in the case of inter-frame encoding, the logo insertion DCT coefficients (f) is input into a subtraction section 71 in which a DCT coefficients 80 is subtracted from the logo insertion DCT coefficients (f). A DCT prediction error coefficient output from the subtraction section 71 is requantized in the requantization section 72 according to rate control information from the rate controller 7 (Refer to FIG. 1), is encoded in the variable-length coding section 73, and then output as MPEG encoded data.

The data which has been requantized in the requantization section 72 is also input into an inverse quantization section 74 for inverse quantization. Then, the DCT prediction error coefficient is subtracted from the DCT coefficients after inverse quantization in a subtraction section 75. By the subtraction, a quantization error in the DCT prediction error coefficient is obtained. Inverse DCT transformation of the quantization error is executed in an inverse-DCT-transformation section 76, and the error after the transformation and video data which has been compensated in a motion compensation section 78 are added in an addition section 77.

Motion compensation is executed in the motion compensation section 78, based on coding information supplied from the switching section 70b. When the logo mixing ratio is larger than a predetermined threshold, encoding is executed, assuming that a motion amount MV is zero for motion-compensation prediction, because the intensity of the logo image is high and the logo image is a static image. On the other hand, in the case of a small transparency factor α, the motion compensation prediction for the original MPEG data is used as it is, since it may be assumed that the ratio of the original video is high In this case, when the transparency factor α is larger than Th, MV=0 is supplied to the motion compensation section 78, and, when the coefficient α is equal to or smaller than Th, the coding information (b) from the partial decoder 1 is supplied to the motion compensation section 78. A memory 79 is used for operation in the motion compensation section 78. After motion compensation in the motion compensation section 78, the transformed DCT coefficients 80 is supplied to the subtraction section 71.

Since a strain component for requantization is reduced in the subtraction section 71 according to the requantization, requantization noise in the logo insertion region is further reduced for requantization of the logo insertion region.

Moreover, since motion compensation is executed, using motion information obtained from the coding information (b), motion search processing, with heavy processing load, for encoding processing of the video can be eliminated as seen in FIG. 7, therefore high-speed encoding processing can be achieved.

In FIG. 7, requantization can be executed in the requantization section 72, using the rate control information. In this case, the quantization step for requantization can be decided, based on the distributed amount of bits obtained from the rate control information. Moreover, the complexity of the picture can be used for deciding the distributed amount of bits, but the complexities for the local picture and the whole picture, which have been predicted from the quantization information obtained by partial decoding of the compressed video which has been input, can be also used as the complexity of the picture as previously described. Thereby, the processing amount for measuring the deviation of the picture can be reduced.

However, for example, when the contrast of the original video is high, and that of logo image is low, the effect by the original video becomes large, even if the logo mixing ratio is high. In this case, the encoding efficiency can be more improved by using the motion compensation prediction in the original MPEG data as it is, than by setting the motion amount MV as zero. Conversely, when the contrast of the logo image is high, and that of the original video is low, the intensity of the logo image is increased, even if the logo mixing ratio is low. In this case, there is a possibility that the encoding efficiency can be more improved by setting the motion amount MV as zero. Accordingly, it is preferable in such a case to execute adaptive motion-compensation prediction so that the encoding amount of the video after insertion becomes smaller.

Figure 8:
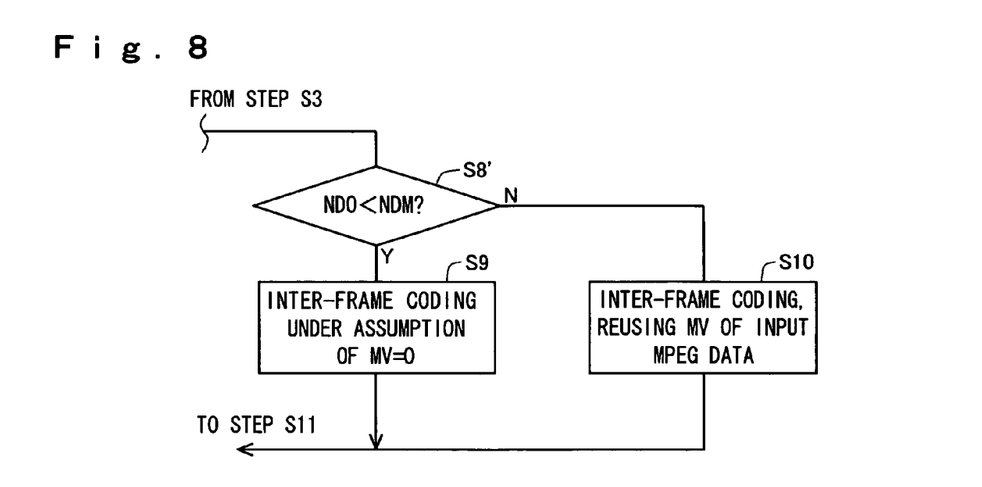
FIG. 8 is a flow diagram showing only changed parts in a variation example of FIG. 5.

In one concrete method for the adaptive motion-compensation prediction, a prediction method for a smaller coding amount is selected by comparison of the amounts of the motion compensation prediction errors for the video after the logo insertion. A variation example of FIG. 5 which is shown in FIG. 8 can be used as a comparison method. In this case, the DCT coefficients amount of motion-compensation-prediction errors is used as an error amount for the motion compensation predictions. As one example, assuming that the DCT coefficients amount at MV=0 is NDO, and the DCT coefficients amount obtained by using the original motion compensation prediction is NDM, encoding is executed by using MV=0 when NDO is smaller than NDM, while the original motion compensation prediction is used when NDO is larger than NDM. A number of non-zero DCT coefficients in a block, or the absolute sum of the DCT coefficients can be used as the DCT coefficients amount.

Figure 5:
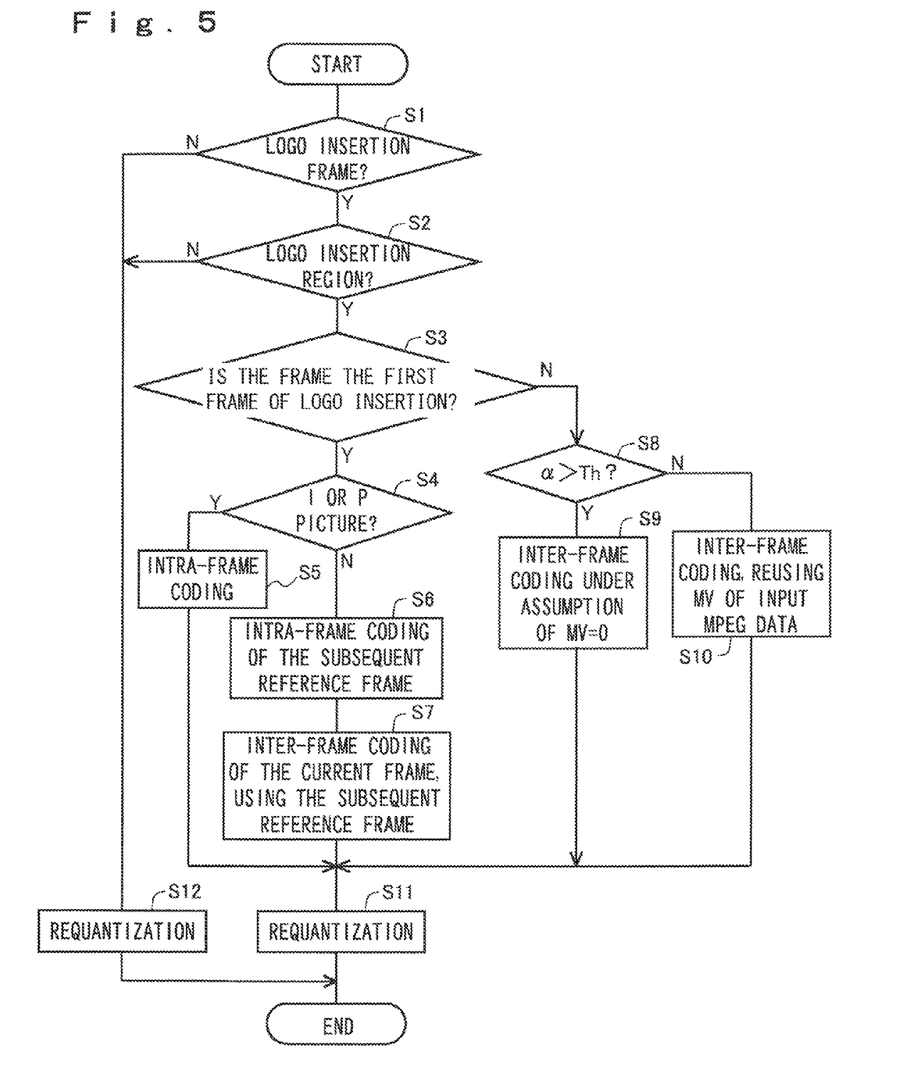
FIG. 5 is a flow diagram explaining operations in principal parts according to the present embodiment.
Figure 9:
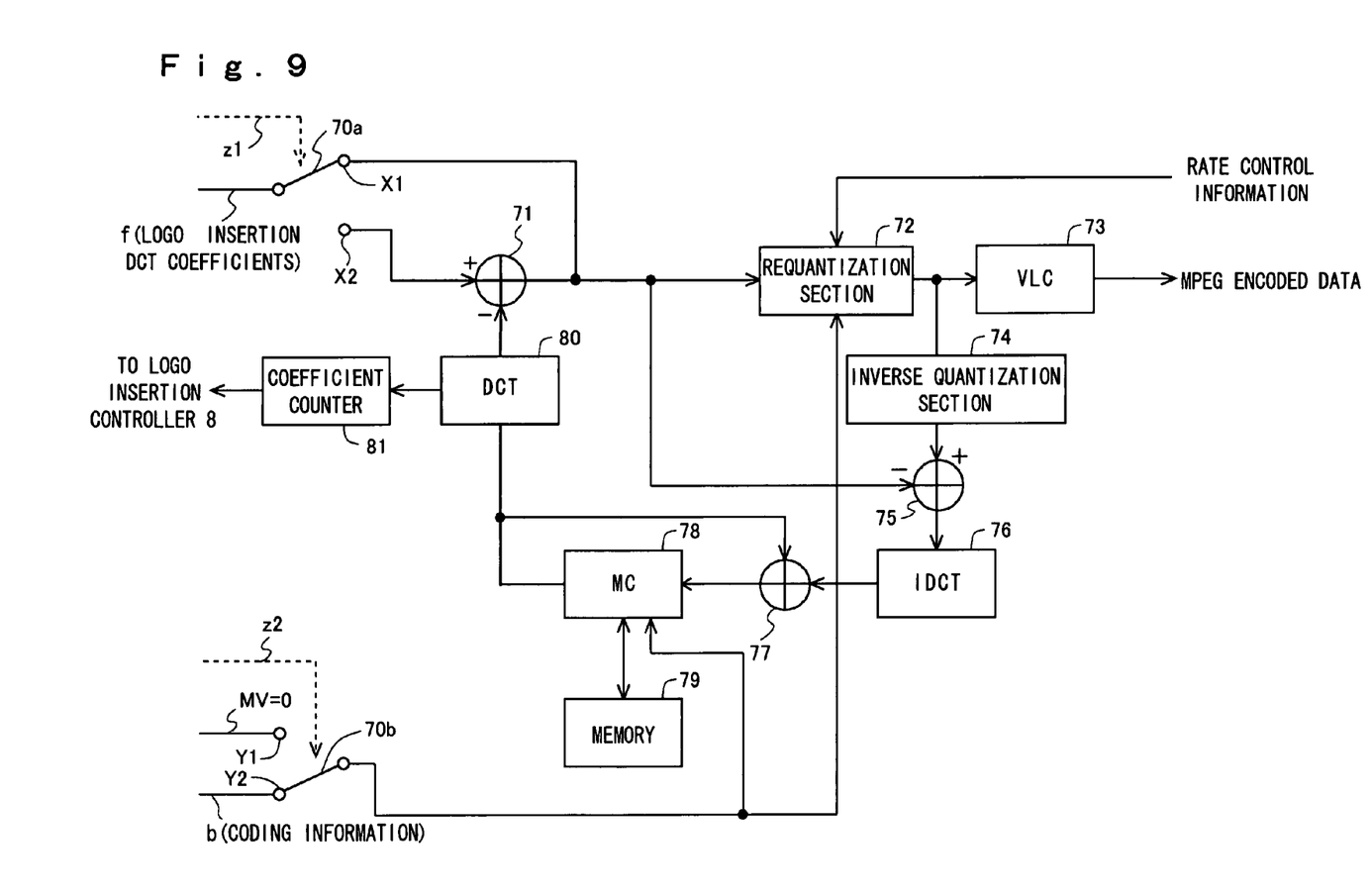
FIG. 9 is a block diagram showing another concrete example of the logo region partial re-encoder in FIG. 1.

Difference between FIG. 8 and FIG. 5 is only in a step S8', and other steps are the same to each other. That is, it is judged at the step S8' whether a count value NDO of a coefficient counter 81 in FIG. 9 (DCT coefficients amount) is smaller than the above-described NDM or not. Then, when the judgment is YES, the processing proceeds to a step S9 at which inter-frame coding is executed, assuming that a motion vector MV is set as zero. On the other hand, in the case of NO, the processing proceeds to a step S10 at which inter-frame coding is executed, reusing the motion vector MV of input MPEG data.

Here, the coefficient counter 81 counts a DCT coefficients 80 of the information amount of a prediction error. When it is determined at the step S8' that NDO is smaller than NDM, the DCT coefficients for the information amount of a prediction error is small, that is, the motion of the video is small, therefore the motion vector MV is forced to be set as zero and the processing amount is reduced. Conversely, since, when it does not hold true that NDO is smaller than NDM, the DCT coefficients of the information amount of a prediction error is large, that is, the motion of the image is large, the motion vector MV of the input MPEG data is reused as the motion vector MV. Here, it is obvious that the control described in FIG. 5 can be also applied in the logo region partial re-encoder 5 in FIG. 9.

Figure 10:
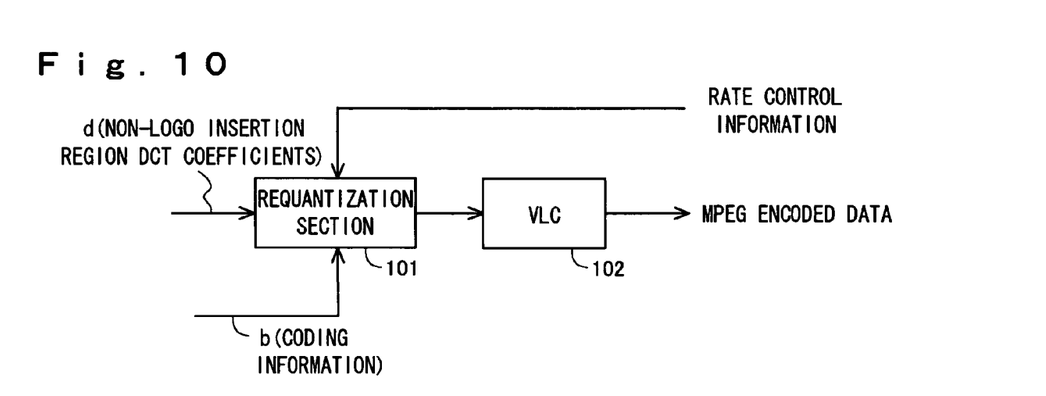
FIG. 10 is a block diagram showing one concrete example of a non-logo region partial re-encoder in FIG. 1.

Then, FIG. 10 shows a recoding operation in the non-logo region partial re-encoder 6 in FIG. 1, or at the above-described step S12 (Refer to FIG. 5). The non-logo region partial re-encoder 6 comprises a requantization section 101 for requantizing the non-logo insertion region DCT coefficients (d) by reusing a quantization parameter QP of coding information (b), or rate control information from the rate controller 7 and a variable-length coding section (VLC) 102. Preferably, in the requantization section 101, the video is requantized by reusing the quantization parameter QP of the coding information (b) when the video is not a logo insertion frame, while according to the above rate control information when the video is the logo insertion frame and not a logo insertion region. The reason is that bit distribution at encoding is changed by inserting the logo.

Here, the quantization can be also used for the logo region in a similar manner as a variation example. However, in the case of the inter-frame coding, there is a possibility that error noise caused by quantization is accumulated.

Though a case in which input data is MPEG compressed data, and a case in which a logo image is applied have been explained as an example in the embodiment, the present invention is not limited to the above case, and may be also applied to a case in which the input data is data which is compressed by another compression method, or a case in which an another image except the logo image is applied.

Moreover, the MPEG method has been explained in the embodiment, but the present invention is not limited to the method. The invention can be used for quantization encoding such as vector quantization, or transform encoding such as wavelet transforming.

As clearly seen in the explanation, an image, for example, a logo video can be inserted into a part of an original video with a small processing amount according to the present invention.

Moreover, according to the present invention, a part into which an image is inserted can be recompressed without causing an insufficient amount of bits and image degradation, and with a high speed and a high efficiency, even if the encoding mode of the whole starting frame for inserting an image is a bidirectional prediction encoded frame.

Furthermore, according to the present invention, the part into which an image is inserted can be recompressed without causing degradation of the part.

What is claimed is:

1. An image insertion device for compressed video data, comprising:
    a partial decoder for partially decoding of compressed video data which has been input;
    an image insertion region separator separating an image insertion region in the partially decoded video data;
    an image insertion unit for inserting an image into the image insertion region;
    a partial re-encoder for encoding and recompressing the image which has been inserted in the image insertion region; and
    a bit-amount control unit for controlling the bit amount of recompressed data with the partial re-encoder to a target bit amount,
    wherein the partial re-encoder determines an encoding mode of the image inserted in the image insertion region of a insertion starting frame for inserting the image, by which insertion of the image is started, according to a picture type of the insertion starting frame,
    wherein the partial re-encoder executes intra-frame coding of the image inserted in the image insertion region of the insertion starting frame when the insertion starting frame is an intra-coded frame,
    executes intra-frame coding of the image insertion region of the insertion starting frame when the insertion starting frame is a predictive-coded frame, and
    executes, when the insertion starting frame is bidirectionally predictive-coded frame, intra-frame coding of the image insertion region of a subsequent reference predictive-coded frame referred to by the insertion starting frame, and then executes unidirectionally inter-frame coding of the image insertion region of the insertion starting frame from the subsequent reference predictive-coded frame.

2. The image insertion device for compressed video data according to claim 1, wherein
    the partial recompression is changed according to the mixing ratio of the inserted image.

3. The image insertion device for compressed video data according to claim 1, wherein
    the partial re-encoder changes a method for motion compensation prediction, depending on the image insertion region or on an image non-insertion region.

4. The image insertion device for compressed video data according to claim 1, wherein
    quantization in the partial re-encoder is controlled by using quantization information of the compressed video data which has been input, and bit-amount control information from a rate control unit.

5. The image insertion device for compressed video data according to claim 1, wherein
    a processing amount for motion search is reduced by using motion information of the compressed video data which has been input.

6. The image insertion device for compressed video data according to claim 1, wherein
    encoding is executed, assuming that a motion amount is zero when the inter-frame coding is used in the image insertion region, and a motion information in the compressed image data, which has been input, is used in an image non-insertion region.

7. The image insertion device for compressed video data according to claim 1, wherein
    encoding is executed, assuming that a motion amount is zero, or using motion information in the compressed image data, which has been input, as it is, when inter-frame coding is used in the image insertion region; and using motion information in the compressed image data, which has been input, in an image non-insertion region.

8. The image insertion device for compressed video data according to claim 1, wherein
the partial re-encoder changes a motion compensation prediction method according to the mixing ratio of the inserted image.

9. The image insertion device for compressed video data according to claim 8, wherein
encoding is executed, assuming that a motion amount is zero when the mixing ratio of the inserted image is larger than a predetermined threshold; and a motion amount in the compressed image data, which has been input, is used when the mixing ratio is equal to or smaller than the threshold.

10. The image insertion device for compressed video data according to claim 8, wherein
a transparency factor $\alpha$ is used as the mixing ratio.

11. The image insertion device for compressed video data according to claim 1, wherein
in the partial re-encoder, the information amount of a prediction error under assumption that a motion amount is zero, and that under use of an original motion compensation prediction are compared in the first place, and, then, encoding is executed under assumption that the motion amount is zero in a case in which the former information amount is smaller than the latter information amount, and under use of the original motion compensation prediction in a case in which the former information amount is larger than the latter information amount.

12. The image insertion device for compressed video data according to claim 11, wherein
the information amount of a prediction error is the number or the absolute sum of non-zero DCT coefficients.

13. The image insertion device for compressed video data according to claim 1, wherein
quantization in the partial re-encoder is executed by using a transform coefficient which is directly quantized after intra-frame coding or inter-frame coding.

14. The image insertion device for compressed video data according to claim 1, wherein
quantization in the partial re-encoder is executed by partially decoding a transform coefficient, after inter-frame coding in a partial manner, for motion compensation prediction, and by using the transform coefficient which has been transformed and quantized after the motion compensation prediction.

15. The image insertion device for compressed video data according to claim 13, wherein
the quantization is controlled according to the complexity of the image on a picture, and the quantization information of the compressed video data, which has been input, is used as the complexity.

16. The image insertion device for compressed video data according to claim 1, wherein
the image is inserted with an arbitrary mixing ratio.

17. The image insertion device for compressed video data according to claim 1, wherein the partial re-encoder determines whether the image inserted in the image insertion region is of the insertion starting frame, and if not, the partial re-encoder executes inter-frame coding of the image insertion region and changes a motion compensation prediction method in accordance with a transparency factor $\alpha$ of the inserted image.

18. The image insertion device for compressed video data according to claim 17, wherein the partial re-encoder sets a motion vector to zero when the transparency factor $\alpha$ of the inserted image is larger than a predetermined threshold.

* * * * *